United States Patent [19]

Nubel et al.

[11] Patent Number: 5,512,635

[45] Date of Patent: * Apr. 30, 1996

[54] PROCESS FOR PREPARING LINEAR MONOFUNCTIONAL AND TELECHELIC DIFUNCTIONAL POLYMERS AND COMPOSITIONS OBTAINED THEREBY

[75] Inventors: Philip O. Nubel; Howard B. Yokelson; Steven A. Cohen, all of Naperville; Raymond T. Behrends, Lombard; William G. Bouslog; James P. Nelson, both of Naperville, all of Ill.

[73] Assignee: Amoco Corporation, Chicago, Ill.

[ * ] Notice: The portion of the term of this patent subsequent to Apr. 4, 2012, has been disclaimed.

[21] Appl. No.: 167,668

[22] Filed: Dec. 15, 1993

Related U.S. Application Data

[63] Continuation-in-part of Ser. No. 68,236, May 27, 1993, Pat. No. 5,403,904, and a continuation-in-part of Ser. No. 68,240, May 27, 1993.

[51] Int. Cl.$^6$ ............................................. C08F 4/69
[52] U.S. Cl. .................... 525/247; 525/269; 525/270; 525/274; 525/289; 525/295; 525/297; 525/300; 525/308; 525/310; 525/313; 525/315; 526/139; 526/141; 526/142; 526/161; 526/166; 526/169; 526/169.1; 526/169.3; 585/313
[58] Field of Search ........................... 526/142, 329.1, 526/139, 141, 142, 161, 166, 169, 169.1, 169.3; 525/247, 269, 270, 274, 289, 295, 297, 300, 308, 310, 313, 315; 585/313

[56] References Cited

U.S. PATENT DOCUMENTS

| | | | |
|---|---|---|---|
| 3,597,403 | 8/1971 | Ofstead | 260/88.2 |
| 3,597,406 | 8/1971 | Calderon | 260/93.1 |
| 3,783,136 | 1/1974 | Inukai | 260/410.9 R |
| 3,798,175 | 3/1974 | Streck et al. | 252/429 B |
| 3,857,825 | 12/1974 | Streck et al. | 260/88.1 R |
| 3,935,179 | 1/1976 | Ofstead | 260/93.1 |
| 3,974,092 | 8/1976 | Streck et al. | 252/429 B |
| 3,974,094 | 8/1976 | Streck et al. | 252/429 B |
| 4,010,224 | 3/1977 | Scott et al. | 260/878 R |
| 4,020,254 | 4/1977 | Ofstead et al. | 526/128 |
| 4,172,932 | 10/1979 | Ofstead et al. | 526/142 |
| 4,429,089 | 1/1984 | Pedretti et al. | 526/153 |
| 4,469,809 | 9/1984 | Klosiewicz | 502/117 |
| 4,520,181 | 5/1985 | Klosiewicz | 525/247 |
| 4,699,963 | 10/1987 | Klosiewicz | 526/142 |
| 4,918,039 | 4/1990 | Martin | 502/313 |
| 4,950,826 | 8/1990 | Zerpner et al. | 585/353 |
| 4,977,226 | 12/1990 | Sugawara et al. | 526/122 |

OTHER PUBLICATIONS

Ichikawa and Fukuzumi, "Metathesis of 1–Alkene," Feb. 17, 1976, pp. 2633–2635.

Tao and Wagener, "Acyclic Diene Metathesis (ADMET) Polymerization Synthesis of Telechelic Polyacetylene" *Polymer Preprints*, 34, 469–470 (1993).

Marmo and Wagener, "Acyclic Diene Metathesis (ADMET) Depolymerization, Synthesis of Mass–Exact Telechelic Polybutadiene Oligomers", *Macromolecules*, (1993).

Schrock, et al., "Preparation of Reactivity of Several Alkylidene Complexes of the Type W(CHR–) (N–2, 6–$C_6H_3$–i–$Pr_2$) $(OR)_2$ and Related Tungstocyclobutane Complexes, Controlling Metathesis Activity Through the Choice of Alkoxide Ligand" May 26, 1987 *J. Am. Chem. Soc.* 1988, 110, 1423–1435.

Cramail, et al. "Functional Oligomers of Norbornene Pt. 1 Oligomerization by Ring–Opening Metathesis polymerization in the Presence of Unsaturated Diesters" *Journal of Molecular Catalysis* 65 (1991) 193–203.

Reyx, et al. "Distribution of the Dienic and Trienic α–ω–Difunctionalized Oligomers in the Cross–Metathesis between Cyclopentene and Dimethyl Hex–3–enedioate" *Journal of Molecular Catalysis*, 36 (1986) 101–105.

Reyx et al. "Application de la reaction de metathese a la synthese de prepolymares α–ω–bifonctionnels", *Makromol. Chem.* 183, 173–183 (1982).

Verkuijlen, et al. "Metathesis of Low–Molecular Unsaturated Acid Esters" *Recl. Tray. Chim. Pays–Bas*, 96 (1977), 86.

Ivin, "Olefin Metathesis" pp. 149–151, (1983).

Kirk–Othmer, "Encyclopedia of Chem. Tech." 3rd Edition vol. 8, p. 597.

Wagener, et al. "The Key to Successful Acyclic Diene Metathesis Polymerization Chemistry", *Makromol. Chem.* 191, 365–374 (1990).

*Primary Examiner*—Romulo H. Delmendo
*Attorney, Agent, or Firm*—Ronald S. Courtney; Mary J. Kanady; Wallace L. Oliver

[57] ABSTRACT

This invention relates to a process for preparation of non-crosslinked linear monofunctional and telechelic difunctional unsaturated polymers wherein the functional groups are reactive terminal groups other than vinyl groups. The average functionality number of the monofunctional unsaturated polymers is at least 0.7, as determined by nuclear magnetic resonance spectroscopy (NMR). The average functionality number of the telechelic difunctional polymers is at least 1.7, as determined by NMR. Monofunctional olefins and difunctional olefins are reacted with cyclic olefins or unsaturated polymers to prepare difunctional polymers. The process is substantially free of side reactions comprising double bond migration and cyclization. The unsaturated functional polymers can be reacted in condensation, addition and transesterification reactions to prepare polyesters, graft copolymers, polyurethanes, polyureas, polyamides, thermoplastic and thermosetting resins, block copolymers, ion exchange resins, adhesives, films, fibers, foams and flocculants.

10 Claims, No Drawings

5,512,635

PROCESS FOR PREPARING LINEAR MONOFUNCTIONAL AND TELECHELIC DIFUNCTIONAL POLYMERS AND COMPOSITIONS OBTAINED THEREBY

This is a continuation-in-part of application Ser. No. 08/068,236, filed May 27, 1993, now U.S. Pat. No. 5,403,904, and application Ser. No. 08/068,240 filed May 27, 1993, pending.

FIELD OF THE INVENTION

This invention relates to an olefin metathesis process for preparing non-crosslinked linear mono- and telechelic polymers wherein the chain terminal groups are functional reactive groups, and to compositions obtained thereby. The functional reactive groups include ester groups such as acrylate, undecylenate, and methacrylate groups. The process uses olefin metathesis reactions wherein monofunctional acyclic olefins are reacted in a first step reaction in the presence of a catalyst comprising a transition metal compound, an organic tin compound or aluminum halide and an organic Lewis base to prepare a linear mono- or difunctional olefin which in a second step reaction is reacted with a cyclic olefin or unsaturated polymer in the presence of the same catalyst to prepare linear telechelic low molecular weight polymers of high functional purity. Undesired side reactions such as double bond migration are minimized by the selected catalyst. Monofunctional linear acyclic olefins of up to 30 carbon atoms or unsaturated linear polymers with reactive endgroups are used to prepare non-crosslinked difunctional linear acyclic olefinic polymers with reactive terminal groups. The preparation of difunctional linear acyclic olefinic polymers with reactive terminal groups from readily available olefinic monofunctional compounds overcomes limitations of previous processes which relied upon the preparation of difunctional olefinic compounds by ring-opening reactions of cyclic olefins with ring-attached reactive groups. The resulting prior art compounds were typically crosslinked compounds. The linear telechelic low molecular weight polymers of high functional purity can be selectively reacted in a third reaction to prepare low and high molecular weight polymers with terminal ester, alcohol, amide, amine, or urea groups.

Accordingly, this invention relates to preparation of non-crosslinked monofunctional polymers and telechelic difunctional polymers by metathesis reactions of two olefins with each other, or wherein one olefin reactant is a long chain acyclic unsaturated polymer or a cyclic olefin, and the other reactant is a acyclic olefin reactant having at least one terminal functional group, particularly an ester group such as an acrylate group or a methacrylate group or an undecylenate group. This invention also relates to non-crosslinked monofunctional polymers and telechelic difunctional polymers prepared by the process of this invention.

BACKGROUND OF THE INVENTION

Although the preparation of monomeric unsaturated mono- and difunctional compounds, such as mono- and dicarboxylic acid esters by an addition reaction of an olefin with a mono- or dicarboxylic acid ester is well known, as is taught in U.S. Pat. No. 3,783,136, the preparation of linear alpha, omega difunctional polymers by an olefin metathesis reaction typically has been limited to a few special cases where the reaction is specific for a certain few reactants.

The disproportionation or metathesis of olefins is a reaction in which one or more olefinic compounds are transformed into other olefinic compounds of different molecular weights. The disproportionation of an olefin to produce an olefin of higher molecular weight and an olefin of lower molecular weight can be a self-disproportionation reaction as propylene to ethylene and butene, or co-disproportionation of two different olefins to produce still other olefins, also termed cross-metathesis of olefins.

The utility of the olefin disproportionation reaction, commonly termed an olefin metathesis reaction, has been recognized as a means to obtain olefinic compounds bearing functional reactive groups such as esters, ethers, halogens and others. However, inasmuch as the olefin metathesis reaction is an equilibrium reaction of unsaturated compounds, the usual consequences of an equilibrium reaction can be present, i.e., yields of the desired product can be low unless a suitable means of driving the reaction to completion can be utilized. Also, the catalyst present to initiate olefinic metathesis can initiate by-product reactions. The reverse of the olefinic metathesis reaction can occur wherein the reaction products self-metathesize to form other olefinic compounds. Terminal olefins have been found to self-metathesize rapidly such as in the industrial process for conversion of propylene to other products. The cis-trans configuration of the final product may be predominantly trans, or predominantly cis, or a mixture of cis-trans, depending upon reaction conditions, including the catalyst utilized.

The disproportionation of olefins bearing functional groups is an especially economically useful reaction in that compounds bearing functional groups are valuable for use in polymer formation and chemical transformations to yield industrially valuable products. Examples of functional reactive groups previously available are esters, alcohols, amines, halides. Monofunctional and difunctional hydrocarbon polymers of olefinic compounds having at least one internal carbon-to-carbon double bond wherein the functional groups are acrylates, methacrylates, or undecylenates have not been previously available by disproportionation of olefins.

Polymers having terminal functional endgroups can be further reacted to form telechelic difunctional polymers. Telechelic polymers having functional groups useful for further reactions, i.e., cross-linking reactions or the construction of other defined polymer structures such as block copolymers, etc., are of great interest from the viewpoint of possible applications. A halogen-terminated polymer can be reacted with an unilaterally metal-terminated chain of another polymer to produce block copolymers. Hydroxy-terminated polymer chains can be reacted with di-and/or tri-polyisocyanates and/or analogous polyfunctional compounds such as acid chlorides of polybasic acids. Ester-terminated polymer chains can be reacted with alcohols or other reactive functional groups for adhesive, coating, fiber, foam and other applications.

Monofunctional and telechelic difunctional polymers have been prepared in the past by termination of living polymers with anionic, cationic and metathesis polymerizations of cyclic olefins. Metathesis polymerizations of cyclic olefins can restrict the availability of products to those which can be prepared from a relatively few cyclic olefins, typically of from about 5 to about 9 carbon atoms. Functional groups in monofunctional and difunctional polymers derived from cyclic olefins can be limited to those present in the precursor cyclic olefins. With acyclic olefins, the olefin metathesis reaction can result in cleavage and reforming of carbon-to-carbon double bonds. The resulting redistribution of alkylidene moieties leads to a random product distribution at equilibrium (Kirk-Othmer, *Ency, Chem. Tech.*, 3th ed., 8 (597). Telechelic difunctional hydrocarbon polymers produced via anionic or free-radical polymerizations of acyclic olefins typically are mixtures of polymer structures. For example, alpha-omega difunctional polybutadienes prepared by anionic or free-radical polymerization of butadiene contain mixtures of 1,4- and 1,2-polybutadiene structures, have molecular weights of 1000–4000 and are terminated with hydroxy or carboxy functionalities. Typically, the functionalities are less than difunctional, the functionality number (Fn) being less than 2; or greater than difunctional, the functionality number being greater than 2, and the products are mixtures of mono-functional, difunctional, trifunctional, and non-functional species.

This invention accordingly relates to a process for preparation of non-crosslinked linear telechelic oligomers and polymers of high difunctional purity by olefin metathesis reactions in a two-reaction sequence. The first reaction (A) comprises a metathesis reaction wherein a linear acyclic olefin containing at least one terminal functional group is reacted in a self-metathesis reaction to prepare a linear functional olefinic product. The second reaction (B) comprises a ring-opening polymerization of a cyclic olefin in the presence of the linear difunctional olefin product of reaction (A). The product of reaction (B) can be further reacted to prepare difunctional alcohols, acids and amines.

The linear acyclic functional olefin of reaction (A) can be prepared by reacting a monofunctional linear olefin with a second olefin in a cross metathesis reaction wherein the second olefin is selected from the group consisting of a cyclic olefin of from 4 to 30 carbon atoms and an acyclic unsaturated polymer of number average molecular weight of up to about 1,000,000. The product of the reaction between the monofunctional olefin and a second olefin can be a mixture of species; i,e., monofunctional, difunctional and nonfunctional.

The functional olefin which can be the reaction product of a polymer employed as a reactant in reaction (A) of the process of the instant invention can be reacted in reaction (B) in the process reactor in situ without separate purification.

The instant invented process accordingly comprises methods for preparing the precursor functional olefins from acyclic and cyclic olefins and unsaturated polymers. Conversion of reactants is at least 10% of theoretical based on olefinic reactants.

The invented process utilizes a catalyst composition comprising (a) a transition metal chloride, oxyhalide, oxide or ammonium salt, (b) an organic tin compound or aluminum halide reagent, and (c) an organic Lewis base, wherein undesired side reactions such as double bond migration are minimized.

The non-reactivity of certain unsaturated compounds in the olefin metathesis reaction, such as methyl methacrylate, has been documented, K. J. Ivin, *Olefin Metathesis*, Academic Press, London, N.Y., (1983), 151. Dialkyl maleates or fumarates have been reported to be virtually unreactive in olefin metathesis reactions, Verkuijlen, et al. *Recl. Trav. Chim.*, Pays-Bas (1977), 96, M86. However, dimethyl-3-hexene-1,6-dioate, which is costly and is not commercially available in bulk quantities, has been reported to cross-metathesize with 1,5-cyclooctadiene, Reyx, et al. *Makromol. Chem*, (1982), 183, 173–183, cyclopentene, Reyx, et al., *J. Molecular Catal.*, (1986), 36, 101– 105, or norbornene, and has been shown to yield oligomers/polymers which are not high in difunctional purity, Cramail, et al., *J. Molecular Catal.*, (1991), 65, 193–203.

Surprisingly, it has been found that linear functional acyclic olefins comprising monofunctional unsaturated polymers containing groups such as acrylates, methacrylates and undecylenates can be prepared in the presence of the catalyst composition of the instant invented process in metathesis reactions of alkyl acrylates or alkyl methacrylates or alkyl undecylenates with acyclic or cyclic olefins.

In the process of the instant invention, in the presence of reactants comprising cyclic olefins and functional olefins such as acrylates or methacrylates or alkyl undecylenates, linear difunctional telechelic unsaturated polymers are prepared with at least one internal carbon-to-carbon double bond and ester groups such as acrylate, methacrylate or undecylenate terminal groups. These linear non-crosslinked difunctional telechelic unsaturated polymers with reactive terminal groups are suitable for further functionalization or incorporation into other polymers for preparation of block copolymers, polyesters, polyamides, polyureas, graft copolymers thermoplastic resins, films, fibers, foams, ion exchange resins, adhesives and flocculants.

The linear non-crosslinked difunctional telechelic unsaturated polymers prepared by the process of this invention are true linear compounds of strictly regular structure with exactly defined terminal groups. Such polymers with acrylate, undecylenate, and methacrylate endgroups have not heretofore been produced.

Although acyclic unsaturated compounds containing functional groups have been prepared by the olefin metathesis reaction, it has been indicated that when the functional group is too close to the double bond, the metathesis reaction does not work. The non-reactivity of methyl methacrylate has been ascribed to this, K. J. Ivin, *Olefin Metathesis*, Academic Press, London, N.Y., (1983), 149–151. Surprisingly, it has been found that in the process of the instant invention, olefinic compounds such as methyl methacrylate can be reacted to prepare monofunctional and telechelic difunctional oligomers or polymers by olefin metathesis reactions.

As is well known, side reactions can occur during olefin metathesis reactions. These side reactions include alkylation, isomerization, cyclization and addition across double bonds present in the molecular structure. Surprisingly, it has been found that in cross-metathesis reactions under the conditions of the present invention, these side reactions are minimal. The average functionality number of monofunctional polymers prepared by the process of this invention is at least 0.7 as determined by nuclear magnetic resonance spectroscopy (NMR). The average functionality number of telechelic difunctional polymers prepared by the process of this invention is at least 1.7, as determined by nuclear magnetic resonance spectroscopy (NMR).

DESCRIPTION OF THE PRIOR ART

Previous procedures to prepare polymeric hydrocarbons having reactive functional terminal groups other than double bonds frequently have utilized cyclic olefinic compounds in conjunction with a ring opening step. Ofstead, U.S. Pat. No. 3,597,403, teaches a process for ring-opening polymerization of unsaturated alicyclic compounds, preferably unsaturated alicyclic compounds of a single unsaturated alicyclic ring containing at least four carbon atoms and not more than five carbon atoms wherein the carbon-to-carbon double bonds in the ring are not adjacent and are non-conjugated in the presence of a catalyst system comprising an alkylaluminum halide, molecular oxygen, and a compound of tungsten or molybdenum. Streck, et al., U.S. Pat. No. 3,798,175 teaches a process for ring opening polymerization of cyclic olefins and forming terminal carbalkoxy groups by employing a catalyst system consisting essentially of (1) a tungsten or molybdenum compound, (2) an organoaluminum compound, (3) an unsaturated carboxylic acid ester. Streck '175 teaches that an unsaturated carboxylic acid ester containing at least one carbon-carbon double bond varies the molecular weight of the resulting polymer by reaction with the double bond of the ring-opened cyclic olefin to produce side chains. Streck, et al., U.S. Pat. No. 3,857,825, discloses a similar reaction in the presence of a polymeric hydrocarbon having an unsubstituted non-conjugated ethylene double bond for production of polymeric hydrocarbons having reactive silyl end groups by a ring-opening polymerization of a cyclic olefin in the presence of a catalytic amount of a halogenated compound of a metal selected from the group consisting of niobium, tantalum, molybdenum, tungsten and rhenium and a halogen, alkoxy, carboxylate or Lewis acid.

Accordingly, although the prior art teaches the preparation of polymeric hydrocarbons having functional end groups such as esters, amines, hydroxyls and other reactive groups, investigators have continued to search for an olefin metathesis process and catalyst for preparation of non-crosslinked difunctional oligomers and polymers with high difunctional purity and having an average functionality of at least 1.7, as determined by NMR, from monofunctional reactants wherein the functional groups are such as cyano groups, ester groups, acid anhydride groups, ether groups, imide groups, halogen atoms and aromatic groups as well as other groups.

Wagener, et al. *Makromol, Chem,* 191,365–374 (1990) reported a successful acylic diene metathesis polymerization wherein vinyl terminated oligo(octenylene)s were synthesized using a Lewis acid-free catalyst, $W(CH-t-Bu)(N-2,6-C_6H_3-i-Pr_2)(OCMe(CF_3)_2)_2$, the catalyst taught by Schrock, et al.. *J. Am. Chem. Soc.* 110, 1423 (1988). Ratio of reactant to catalyst was in a mole ration of 500:1. Yields were reported as essentially quantitative.

Preparation of difunctional terminated unsaturated polymers by olefin metathesis from a polyene and a olefin containing a functional group has been reported by Wagener, et al., *Macromolecules.*26, 2137–2138 (1993); Wagener, et al, *Polymer Preprints,* 34, 469–470 (1993), using the catalyst taught by Schrock, et al. *J. Am. Chem. Soc.,* 110, 1423 (1988) as noted above.

However, the catalyst composition reported as used by Wagener has not been disclosed as commercially available and is difficult and expensive to prepare.

Olefin metathesis Lewis acid catalyst systems have been extensively reported in the prior art. Calderon, et al., U.S. Pat. No. 3,597,406, teach the polymerization of hydrocarbon substituted cyclic compounds to prepare polymers with side chains by a ring-opening polymerization of hydrocarbon substituted cyclooctadienes in the presence of a Lewis acid catalyst system comprising (A) at least one organometallic compound wherein the metal is selected from the group consisting of Ia, IIa, IIb, and IIIa of the Periodic Table of Elements, (B) at least one transition metal salt selected from the group consisting of tungsten and molybdenum halides, and (C) at least one compound of the general formula R—Y—H wherein Y is oxygen, H is hydrogen and R is a radical selected from the group consisting of (1) hydrogen (2) alkyl, (3) aryl, (4) arylalkyl, (5) alkaryl, (6) alkenyl and radicals thereof. Ofstead, U.S. Pat. No. 3,935,179, teaches a ring-opening polymerization of alicyclic hydrocarbons in the presence of a Lewis acid catalyst comprising (A) tungsten or molybdenum halides, (B) alkyl aluminum halides, and (C) an alcohol which may optionally contain a halogen constituent, and (D) an alcohol which has a nitrile substituent for ring opening polymerization of cycloolefins by cleavage of the carbon-to-carbon double bonds. The resulting polymers have repeating units derived from opening of the ring. Similar ring-opening polymerizations of cyclic olefins in presence of a Lewis acid catalyst are also taught in U.S. Pat. Nos. 3,974,092; 3,974,094; 4,010,224; 4,020, 254; and 4,172,932.

Olefin metathesis Lewis acid catalyst systems for polymerizing and copolymerizing diolefins have been taught in the prior art wherein the catalyst system is comprised of a Lewis acid and a particular compound which permits carrying out the polymerization and copolymerization reactions starting with diolefins to give products of desired properties. For example, U.S. Pat. No. 4,429,089 teaches a catalytic system for polymerizing and copolymerizing diolefins comprising a Lewis acid, an aluminum compound and a particular compound belonging to the lanthanide series to give products having a high content of 1,4-cis units and high molecular weights from aliphatic conjugated diolefins such as 1,3-butadiene, 1,3-pentadiene, isoprene and their mixtures. U.S. Pat. No. 4,469,809 teaches a two-part-metathesis catalyst system wherein the first part of the catalyst system is comprised of a metathesis catalyst, preferably, $WOCl_4$, $WCl_6$, and a Lewis base to moderate the polymerization rate of a tungsten/monomer solution, the monomer preferably dicyclopentadiene. The second part of the catalyst system comprises an activator such as tetrabutyltin, triethylaluminum and similar compounds. The activator solution includes an ester, ether, ketone or nitrile which serves to moderate the rate of polymerization. Similar catalyst systems are taught in U.S. Pat. Nos. 4,520,181; 4,699,963; and 4,918,039 wherein a Lewis base was used to moderate the polymerization reaction of a Lewis acid. U.S. Pat. No. 4,918,039 teaches that in the presence of a transition metal halide and a catalyst activator comprising an alkyl tin reagent, the presence of a Lewis base to stabilize the polymerization reaction can be omitted since an alkyl tin activator is a poorer Lewis acid. U.S. Pat. No. 4,977,226 teaches a ring-opening process for polymerizing a norbornene monomer in the presence of a metathesis catalyst system comprising a tungsten compound such as tungsten hexachloride in the presence of a Lewis base to prevent premature polymerization.

The monofunctional polymers and telechelic difunctional polymers prepared by the process of the instant invention are prepared by metathesis reactions which are cross-metathesis reactions between acyclic olefins or cross-metathesis reactions between cyclic and acyclic olefins. Cross-metathesis reactions have been generally classified as being of three categories: (1) exchange of atoms between two olefin compounds to produce two different olefins, (2) ring-opening of a cyclic olefin to produce acyclic polymers, and (3) degradation of olefin polymers to produce oligomers of lower molecular weight. The reactions of the present invention are of the three categories.

With the exception of the teachings of Wagener, *Makromol. Chem,* 191, 365–374 (1990); *Macromolecules,* 26, 2137–2138 (1993); *Polymer Preprints,* 34, 469–470 (1993), prior investigators have not dealt with the problem of preparing monofunctional or difunctional polymers by a metathesis reaction wherein the functional groups are terminal reactive groups other than vinyl groups from acyclic monofunctional olefin compounds and which previously had been found non-reactive in a metathesis reaction. As detailed above, Lewis acid catalysts are taught in the preparation of olefinic compounds via a ring opening reaction. The effect of the presence of Lewis base upon the rate of polymerization by a Lewis acid of an olefinic compound has been recognized but there has been no teaching or inference that a metathesis catalyst system comprising a Lewis acid, an activator and a Lewis base can be used to prepare monofunctional or difunctional polymers by cross-metathesis reactions between acyclic olefins and between acyclic olefins and cyclic olefins.

K. Ichikawa, et al., *J. Org. Chem.*, 41, 2633–2635 (1976) taught use of a Lewis base catalyst as being effective for reactions of 1-alkenes using a $WCl_6/Bu_4Sn$ catalyst with addition of esters, acetonitrile, phenylacetylene, dicyclopentadiene and ethers to improve the selectivity to the metathesis reaction by depressing side reactions. The reactants were 1-pentene, 1-hexene, 1-heptene, 1-octene and 1-decene. The optimum range of the Sn/W mole ratio was from 2:1 to 8:1. The ratio of 1-octabne to $WCl_6$ was 20–400. Products were ethylene and a symmetric internal alkene.

It is accordingly surprising and unexpected that telechelic difunctional polymers having at least one internal carbon-to-carbon double bond wherein the functional groups are terminal reactive groups such as an acrylate, methacrylate, or undecylenate group and the average functionality of the difunctional product is at least 1.7, as determined by NMR, can be prepared from acyclic monofunctional olefins in the presence of a catalyst component comprising a transition metal chloride, oxychloride, oxide, or ammonium salt, an activator comprising an organic tin compound or an aluminum halide compound and an organic Lewis base selected from the group consisting of an ester, nitrile, ether, amine, alcohol, amide, alkyne, and organic phosphorus compounds.

It is therefore an object of this invention to provide a metathesis catalytic process for preparing telechelic difunctional polymers from monofunctional olefins wherein the functional groups are terminal reactive groups and the average functionality is at least 1.7, as determined by NMR. It is further an object of this invention to provide difunctional unsaturated polymers wherein the functional groups are reactive terminal groups other than vinyl groups and thus are positioned for further functionalization and/or incorporation into other reactive compounds. It is further an object of this invention to prepare mono- and difunctional polymers wherein the functional component comprises a terminal functional group, particularly an ester group such as an acrylate group, methacrylate group, or undecylenate group. The reactive terminal groups can be reacted to prepare block copolymers, polyurethanes, polyesters, polyamides, polyureas, and polyacrylics, for such applications as coatings, adhesives, sealants, elastomers, fibers, foams, thermoplastic and thermosetting resins.

It is accordingly surprising and unexpected that unsaturated acyclic functional polymers can be prepared with an olefin metathesis reaction wherein one olefin has been previously reported as unreactive.

It is therefore an object of this invention to prepare monofunctional polymers from monofunctional olefins wherein the monofunctional olefin heretofore has been taught as unreactive in an olefin metathesis reaction.

SUMMARY OF THE INVENTION

This invention relates to a process for preparation of non-crosslinked linear telechelic functional unsaturated polymers of high functional purity wherein the functional groups are reactive terminal groups other than vinyl groups. The average terminal functionality of the difunctional polymers is at least 1.7, as determined by NMR. The process in the presence of a particular catalyst system also comprises the conversion of monofunctional olefins to difunctional olefins or to polymeric functional olefins which are then reacted with cyclic olefins or unsaturated polymers to prepare low molecular weight difunctional polymers. The process is substantially free of side reactions comprising double bond migration and cyclization. The catalyst comprises a composition of a transition metal chloride, oxychloride, oxide, or ammonium salt, an organic tin compound or an aluminum halide, and an organic Lewis base. This invention also relates to the non-crosslinked linear mono- and telechelic difunctional unsaturated polymers of high functional purity prepared by the process of this invention. The monofunctional and difunctional telechelic unsaturated functional polymers prepared by the process of this invention wherein the functional groups are terminal reactive groups can be further reacted to prepare block copolymers, graft copolymers, polyurethanes, polyesters, polyamides, and polyureas, for such applications as coatings, adhesives, sealants, elastomers, films, fibers, foams, thermoplastic and thermosetting resins.

DETAILED DESCRIPTION OF THE INVENTION

This invention relates to a process for preparation of non-crosslinked linear monofunctional polymers in a first reaction and telechelic polymers of high difunctional purity by olefin metathesis reactions in a second reaction, and to the compositions obtained thereby. The first reaction (A) of the process of this invention comprises an acyclic olefin metathesis reaction wherein linear acyclic olefins containing up to 30 carbon atoms and each containing at least one functional group selected from the group consisting of a nitrile, ester, acyl halide, ketone, aldehyde, borane, amide, acid anhydride, ether, imide, halogen atom, and substituted aryl group of up to an additional 30 carbon atoms, are reacted to prepare linear mono- and difunctional olefinic products. The second reaction (B) comprises a ring-opening polymerization of a cyclic olefin in the presence of the linear mono- and difunctional olefin products of reaction (A). The compositions obtained thereby can be further reacted in condensation polymerization reactions to form macromolecules, transesterification reactions to prepare alcohols, or amination reactions to form amines, which, in turn, can be further reacted to prepare additional compounds suitable for further reactions.

Non-crosslinked linear mono- and telechelic polymers obtained by the process of this invention are defined as polymers consisting essentially of strictly linear hydrocarbon chains comprising repeating units of 3 to 30 carbon atoms, said hydrocarbon chains without any side chains or pendant groups which would cause cross-linking. The number of repeating units can be from 3 to about 10,000.

Non-crosslinked linear monofunctional polymers prepared by the process of this invention are defined as monofunctional polymers having one terminal functional reactive group other than a vinyl group and an average functionality number which is at least 0.7, as determined by NMR. Non-crosslinked linear difunctional telechelic polymers prepared by the process of this invention are defined as difunctional polymers containing two terminal functional end-groups other than vinyl groups and the average functionality number is at least 1.7, as determined by NMR. The terminal functional end-groups are specifically defined as reactive terminal groups other than vinyl groups. The monofunctional and difunctional polymers prepared by the process of this invention are further defined as having a predominant absence of non-functional terminal end-groups. The functionality numbers refer to the number of terminal functional groups of the hydrocarbon chains of the polymers prepared by the process of this invention.

Methyl acrylate and methyl methacrylate do not react in self-metathesis reactions to prepare dimers of methyl acrylate and methyl methacrylate but alkyl undecylenates do react in a self-metathesis reaction. Methyl acrylate and methyl methacrylate therefore are unsuitable as self-metathesis reactants for reaction (A) but are suitable as reactants with an acyclic hydrocarbon polymer in reaction (A) and as reactants for reaction (B) whereas alkyl undecylenates can react in a self-metathesis reaction in reaction (A) and are suitable reactants for both reaction (A) and reaction (B). In the preparation of a polymer comprising a linear functional unsaturated polymer with terminal reactive moieties comprising acrylate and methacrylate moieties, the instant invented process comprises reaction (B).

Accordingly, a linear acyclic functional olefinic composition which can comprise a mixture of monofunctional, difunctional, and nonfunctional compounds is suitable for use in reaction (A) wherein the functional group is either an acrylate group or a methacrylate group or an undecylenate group e.g., methyl acrylate or methyl methacrylate or methyl undecylenate, and the other reactant is an acyclic unsaturated hydrocarbon polymer of number average molecular weight of up to about 1,000,000. The reaction is in the presence of a catalyst composition comprising a transition metal chloride, oxyhalide, oxide or ammonium salt, an organic tin compound or aluminum halide reagent, and an organic Lewis base. In reaction (B), the resulting mixture can be reacted with a cyclic olefin to prepare a difunctional oligomer or polymer without purification of the mixture.

Surprisingly and unexpectedly, it has been found that acrylate, or methacrylate, or undecylenate-terminated functional polymers can be prepared in the presence of the above catalyst. The functional acyclic olefin can serve as the Lewis base. The ratios of the three catalyst components are in the range of from about 1.0:0.1:0.1 to about 1.0:20:1000. In reaction (B) the acyclic olefin containing a functional group is also a chain terminating agent. Product molecular weight is controlled by the molar ratio of the cyclic olefin reactant and the functional olefin reactant in reaction (B). The molar ratios of the two reactants are in the range of from about 1:1 to 10,000:1, cyclic olefin to functional acyclic olefin. A low molar ratio yields lower molecular weight products, while a higher ratio yields higher molecular weight products.

The olefin metathesis process of the instant invention for preparation of monofunctional precursor compounds and telechelic difunctional unsaturated polymers wherein the functional groups are reactive terminal groups and the average functionality of the difunctional oligomers and polymers is at least 1.7, as determined by NMR, is especially suited for preparation of polymers by metathesis reaction with certain unsaturated compounds such as methyl methacrylate previously considered non-reactive in a metathesis reaction.

Accordingly, the process of the instant invention utilizes a metathesis reaction between acyclic olefins which may be the same or different olefins to prepare an acyclic functional olefin, and a metathesis reaction between an acyclic difunctional olefin produced thereby and a cyclic olefin, or unsaturated polymer, the process reactions being in two steps, i.e., olefins possessing functional groups are metathesized to yield a mono- or difunctional olefin which is metathesized in a second step with a cyclic olefin or an unsaturated polymer to yield a difunctional polymer product. The olefin possessing a functional group also can be prepared by metathesizing a cyclic olefin of up to 30 carbon atoms or and unsaturated high molecular weight polymer with a monofunctional olefin such as methyl methacrylate or methyl acrylate or methyl undecylenate by a cross-metathesis reaction.

The following general reactions wherein X is a functional group other than a vinyl group and R is a portion of a cyclic molecule or a linear carbon chain of a molecule of up to 30 carbon atoms illustrate the process of the invention:

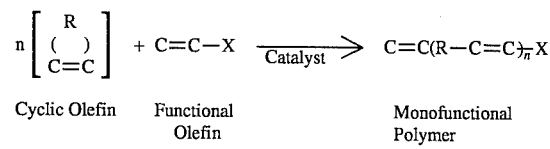

Cyclic Olefin     Functional Olefin     Monofunctional Polymer wherein n is a number from 1 to about 10,000 and

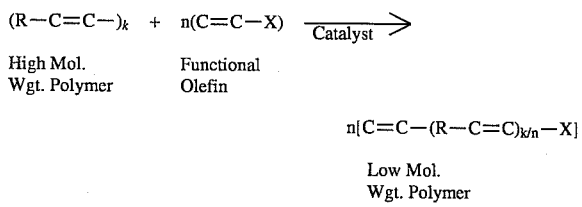

High Mol. Wgt. Polymer     Functional Olefin

Low Mol. Wgt. Polymer wherein k is a number from 1 to about 200,000 and n is a number from 1 to about 10,000

The process of the instant invention can use a ring-opening metathesis reaction of a cyclic olefin in the presence of a functional olefin or a metathesis reaction of an unsaturated high molecular weight polymer with a functional olefin at a temperature of from about 0° C. to about 200° C. and a pressure from about $1 \times 10^{-6}$ mm Hg to about 30 atmospheres.

The two reactions of the invented process to prepare the non-crosslinked linear telechelic oligomers and polymers are by the following reactions:

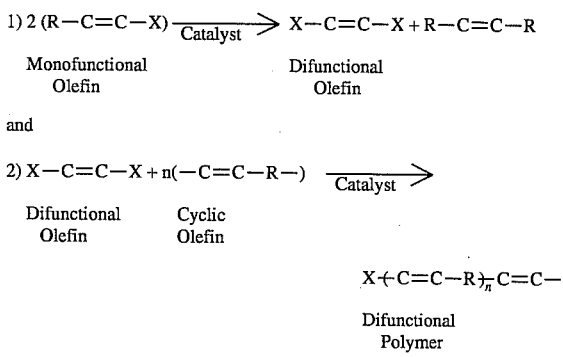

wherein n is a number 1 to about 10,000

The process reactions can be performed sequentially, including the preparation of the precursor compounds, with or without isolation and purification of the products of each step. If desired, the same reaction vessel can be employed for both reactions. All reactions should be liquid phase reactions, using neat liquid reactants, solvents, or diluents.

The invented process utilizes a catalyst composition comprising (a) a transition metal chloride, oxyhalide, oxide or ammonium salt, (b) an organic tin compound or aluminum halide reagent, and (c) an organic Lewis base wherein undesired side reactions such as double bond migration are minimized.

As the transition metal catalyst component, (a), there can be mentioned halides, oxyhalides, oxides and organic ammonium salts, preferably of tungsten, ruthenium, molybdenum, rhenium and tantalum. As preferred examples, there can be mentioned tungsten compounds such as tungsten hexachloride, tungsten oxytetrachloride, tungsten oxide, tridodecylammonium tungstate, methyltricaprylammonium tungstate, tri(tridecyl)ammonium tungstate and trioctylammonium tungstate, molybdenum compounds such as molybdenum pentachloride, molybdenum oxytrichloride, tridecylammonium molybdate, methyitricaprylammonium molybdate, tri(tridecyl)ammonium molybdate and trioctylammonium molydate, rhenium compounds such as rhenium pentachloride, rhenium oxide, rhenium oxide supported on an oxide such as alumina, silica, or silica-alumina, rhenium oxide together with a promoter such as boron oxide on an oxide support, and tantalum compounds such as tantalum pentachloride.

Organic tin compounds, alkylaluminum halides, alkoxyalkylaluminum halides and aryloxy-alkylaluminum halides can be used as the activator (b). As preferred examples, there can be mentioned tetrabutyltin, tetramethyltin, tetraethyltin, tetraphenyltin, ethylaluminum dichloride, diethylaluminum monochloride, ethylaluminum sesquichloride, diethylaluminum iodide, ethylaluminum diiodide, propylaluminum dichloride, propylaluminum diiodide, isobutylaluminum dichloride, ethylaluminum dibromide, methylaluminum sesquichloride, methylaluminum sesquibromide, and precondensates of alkylaluminum halides with alcohols.

The Lewis base (c) useful in this invention includes linear functional olefins having at least one functional terminal reactive group as a reactant in reaction (A), ethers, esters, nitriles, ketones, amides, amines, alkynes, phosphorus compounds, and alcohols of up to 30 carbon atoms. Examples are alkyl and aryl acetates, alkyl acrylates, alkyl methacrylates, alkyl undecylenates, acetonitrile, benzonitriles, acrylonitriles, acetylacetone, tetrahydrofuran, pyridine, N,N'-dimethylformamide, thiophene, ethyl ether, propyl ethers, diphenyl ether, triethylamine, phenylacetylene, organic phosphorus compounds of from 1 to 30 carbon atoms and monohydric and dihydric alcohols of from 1 to 30 carbon atoms such as methyl alcohol, ethyl alcohol, n-propyl alcohol, isopropyl alcohol, n-butyl alcohol, isobutyl alcohol, tert-butyl alcohol, n-pentyl alcohol isopentyl alcohol, 2-methyl-1-butyl alcohol, 2-methyl-2-butyl alcohol, n-hexyl alcohol, n-heptyl alcohol, n-octyl alcohol, isooctyl alcohol, 2-ethylhexyl alcohol, n-nonyl alcohol, n-decyl alcohol, 1,5-pentanediol, 1,6-hexanediol, allyl alcohol, crotyl alcohol, 3-hexane-1-ol, citronellol, cyclopentanol, cyclohexanol, salicyl alcohol, benzyl alcohol, phenethyl alcohol, cinnamyl alcohol, and the like. The Lewis base (c) is preferably an ester, such as an alkyl acetate, instead of an alcohol. A nitrile such as acetonitrile is preferable to pyridine.

The functionalized olefin having at least one functional reactive group contains at least one or more reactive moiety selected from the group consisting of a nitrile, ester, acyl halide, ketone, aldehyde, borane, acid anhydride, ether, amide, imide, halogen atom, alkene, alkyne, alkyl and aryl moiety, and substituted aryl moieties of up to 30 carbon atoms containing at least one reactive substituent. Olefinic unsaturates of the above-named Lewis base compounds can suitably serve as the functional olefin reactant. Typically, the preferred functional olefins contain no more than about 30 carbon atoms per molecule. Suitable functional olefins for use in the process of the instant invention include methyl acrylate, methyl methacrylate, methyl or ethyl 2,4-hexadienoate, ethyl cinnamate, 4-penten-1-yl acetate, methyl or ethyl vinylacetate, isobutyl vinylacetate, cyclohexyl vinylacetate, phenyl vinylacetate, methyl or ethyl 4-pentenoate, amyl 4-pentenoate, benzyl 4-pentenoate, propyl 3-decenoate, methyl 10-undecenoate, ethyl 10-undecenoate, methyl oleate, ethyl oleate, butyl oleate, methyl isooleate, ethyl 6-octadecenoate, butyl 6-ocatdecenoate, ethyl elaidate, butyl elaidate, methyl brassidate, methyl linolate, diethyl 2-allylmalonate, allyl acetate, oleyl acetate, 3-hexenyl acetate, oleyl oleate, 2-hexenyl 2-methylpropionate, 3-hexenyl valerate, 2-hexenyl acetate, allyl propionate, oleyl benzoate, 9-octadecenenitrile, 6-octadecenenitrile, 3-butenenitrile, 1,4-dicyano-2-butene, 4-pentenenitrile, octadecenedinitrile, 9,12-octadecadienenitrile, 9-decenenitrile, 10-undecenenitrile, 9-octadecenyl ethyl ether, 9-octadecenyl isopropropyl ether, crotyl isopropyl ether, trimethylallyloxysilane, allylanisole, allyl phenyl ether, 8-heptadecenyl ethyl ketone, 5-heptadecenyl ethyl ketone, 5-hexen-2-one, 6-methyl-5-hepten-2-one, N,N-diethyloleamide N,N-diethylvinylacetamide, alkyl acrylates, alkyl methacrylates, alkyl undecylenates, 3-buten-1-yl acetate, vinyl acetate, and alkyl sorbates.

In general, any cyclic olefin of from 4 to about 30 carbon atoms can be polymerized in the presence of a functionalized olefin in the process of this invention. The cyclic olefins include both mono- and polycyclic unsaturated hydrocarbon compounds. Representative examples of polycyclic unsaturated hydrocarbon compounds include norbornene, norbornadiene, 2,2,2-bicyclooctene-2, dicyclopentadiene and the like.

The preferred unsaturated alicyclic compounds of this invention are those comprising a single unsaturated alicyclic ring. These alicyclic rings may be mono- or multi-substituted by such groups as alkyl, aryl, arylalkyl, and halogen groups.

Representative examples of unsaturated alicyclic compounds containing a single alicyclic ring having at least 4 and not more than 5 carbon atoms in the cyclic ring and containing one double bond in said ring are cyclobutene and cyclopentene. Representative examples of unsaturated alicyclic compounds containing at least seven carbon atoms in the cyclic ring and containing one or more non-conjugated carbon-to-carbon double bonds in the cyclic ring include cyclooctene; 1,4- and 1,5-cyclooctadiene; 1,4,7-cyclononatriene, cyclodecane, cyclododecene, 1,4-, 1,5- and 1,6-cyclodecadiene: 1,4-, 1,5-, 1,6- and 1,7-cyclododecadiene; 1,4,7- and 1,5,9-cyclododecatriene and the like.

The most preferred unsaturated alicyclic compounds of this invention are those containing from one to three carbon-to-carbon double bonds in the ring and in which the double bonds are located in relation to each other in a manner that they are not adjacent and are non-conjugated. Representative examples of such preferred materials are cyclobutene, cyclopentene, cyclooctene, cyclododecene, and 1,5-cyclooctadiene, 1,5,9-cyclododecatriene and 1,9,17-cyclotetracosatriene.

Representative examples of substituted alicyclic compounds are alkyl-substituted compounds such as 1-methyl-1,5-cyclooctadiene; aryl-substituted compounds such as 3-phenyl-1-cyclooctene: aralkyl-substituted compounds such as 3-benzyl-1-cyclooctene; alkaryl-substituted compounds such as 3-tolyl-1-cyclooctene and halogen-substituted compounds such as a 5-chloro-1-cyclooctene, 1-chloro-1,5-cyclooctadiene; 5-chloro-1-cyclododcene and 5,6-dichloro-1-cyclooctene. Mixtures of the unsaturated alicyclic compounds may be polymerized, including both substituted unsaturated alicyclic compounds and the unsubstituted unsaturated alicyclic compounds.

The olefinic polymer useful as a reactant can be high molecular weight polybutadienes, polyisoprene, butyl rubber, and the like, and mixtures thereof.

The metathesis catalyst comprising (a), the transition metal compound, is used in an amount of about 0.01 to about 50 millimoles, preferably 0.1 to 10 millimoles, of metal per mole of the olefin reactant. The activator (b) is used at a molar ratio of from 0.001 to 200:1 preferably from about 0.1 to about 10, per mole of the catalyst component (a). The organic Lewis base is used at a molar ratio of from about 0.1:1 to about 10,000:1 moles, preferably from about 1:1 to about 100:1 per mole of the catalyst component (a).

Preferably both the metathesis catalyst and the activator are used when dissolved or suspended in the reactants, but the catalyst and activator can be used when suspended or dissolved in a small amount of a solvent, as long as the properties of the product are not substantially degraded. Preferred solvents are benzene, toluene, xylene, pentane, hexane, heptane, cyclohexane, methylcyclohexane, chlorobenzene, dichlorobenzene, and mixtures thereof.

Any reagent for deactivating the activator or the metathesis catalyst system, for example, an alkylaluminum chloride, or the catalyst component of the metathesis catalyst system, for example, a tungsten compound catalyst or a molybdenum compound catalyst, can be used as the stopper for the polymerization reaction. As preferred examples, there can be mentioned alcohols such as methanol, ethanol, n-propyl alcohol and n-butanol, amines such as ammonia, organic acids such as acetic acid and propionic acid, oxygen, carbon dioxide, and water.

If an appropriate amount of an alcohol is used as the stopper for the reaction, only the activator such as an aluminum compound is deactivated but the catalyst component such as a molybdenum catalyst is left in the liquid product in a reusable state. Of course, a stopper capable of deactivating both of the activator and the catalyst component can be used. In the polymerization reaction, the metathesis catalyst component is used in an amount of 0.01 to 50 millimoles, preferably 0.1 to 10 millimoles, per mole of the monomers as a whole. The activator (is used at a molar ratio of from 0.01 to 200, preferably from 1 to 10, to the catalyst component. It is sufficient if the stopper for the polymerization reaction is used in an amount enough to deactivate the catalyst system. The amount differs according to the kind of the activator or the catalyst component, but the amount can be easily determined by preliminary experiments. For example, where a dialkylaluminum halide is used as the activator and an alcohol is used as the stopper for the viscosity-increasing reaction, it is sufficient if the alcohol is used in an amount of at least 2 moles per mole of the activator.

The metathesis polymerization is preferably performed in liquid phase, with catalyst components dissolved or suspended in a solvent or liquid olefin reactant. Reaction temperatures are preferably from about 0° C. to 200° C. Pressure can be in the range of from about $1 \times 10^{-6}$ mm Hg to about 30 atmospheres, preferably from about $1 \times 10^{-6}$ mm Hg to about 1 atmosphere. Any light olefin coproduct (ethylene in the case of polyene reactants with terminal carbon-to-carbon double bonds) should be removed efficiently to drive the reaction to high conversion.

In the practice of this invention, the catalyst composition preferably comprises a tungsten metal chloride, a tetraalkyltin reagent and an organic Lewis base selected from the group consisting of the functional olefin reactant, an alkyl acetate, a nitrile, and an ether. Inasmuch as the tungsten catalyst in the presence of an activator such as a tetraalkyltin compound, in the absence of a Lewis base, can catalyze side reactions in a metathesis reaction of an olefin compound, a sequence of mixing the components of the catalyst system is preferred.

The tungsten compound is preferably suspended or dissolved in a small amount of a suitable solvent, preferably in an olefin monomer if the tungsten compound is soluble in the monomer. An alcoholic or phenolic compound is also suitable, phenolic compounds being preferred over an alcoholic compound. Suitable phenolic compounds include phenol, alkyl phenols, and halogenated phenols, with tert-butyl phenol, tert-octyl phenol and nonyl phenol most preferred. The preferred molar ratio of the tungsten compound/phenolic compound is from about 1:1 to about 1:3. The tungsten compound/phenolic compound solution can be prepared by adding the phenolic compound to the tungsten compound, stirring the solution and then blowing a stream of a dry inert gas through the solution to remove any hydrogen chloride.

The addition of the Lewis base or a chelating agent can be in an amount of from about 0.1 to about 10,000 moles of Lewis base or chelating agent per mole of tungsten compound. Preferred chelants include acetylacetone and alkyl acetoacetates where the alkyl group contains from 1 to 10 carbon atoms. Preferred Lewis bases include nitriles, ethers and esters such as alkyl acetates, benzonitrile, acetonitrile, tetrahydrofuran.

In some metathesis reactions, one of the products of the metathesis reaction is an olefin of a lower molecular weight than the starting monomer. In the instant process, it has been found that removal of the olefin of the lower molecular weight is essential to obtain high reaction conversion. This may be accomplished by suitable means such as purging the reaction vessel with inert gas, by applying a low or high vacuum to the system, or by any combination of these methods during the reaction, including the omission of one or more of these procedures, the said steps being in any sequence and capable of being omitted individually. The inert gas can comprise nitrogen, the low vacuum from about 1 mm Hg to about 400 mm Hg, and the high vacuum to about $1 \times 10^{-6}$ mm Hg.

Color bodies comprising catalyst residue, measured as the presence of tungsten in parts per million (ppm) can impart a color, which may be unacceptable, to polymers prepared by the process of the metathesis reactions using a catalyst comprising a tungsten metal chloride, a tetraalkyltin reagent and an organic Lewis base. Despite treatment and filtration of the polymer product with paper and fiber glass filtration procedures or treatment with diatomaceous earth to remove particulate matter, the filtered and treated polymer product can retain an unacceptable color which is typically a yellow to a dark orange yellow variable color of amber hue. It has been found that reduction of the presence of tungsten to less than 100 ppm, as measured by inductively coupled plasma spectroscopy (ICP), results in a polymer free of a predominant color. This may be accomplished by suitable means such as treatment of the color-containing polymer in a suitable solvent with activated charcoal. The treatment with activated charcoal can be at room temperature and can be for an extended period. Any solvent which can dissolve the polymer and which can be removed easily by evaporation can be suitable.

Graft copolymers can be prepared by reacting linear non-crosslinked mono functional unsaturated polymers with a reactive terminal group wherein the terminal group is an ester moiety with excess vinyl or acrylic monomer to prepare a macromolecule copolymer with a graft-type architecture. Similarly, a block copolymer can be prepared by reacting linear non-crosslinked difunctional unsaturated polymers with reactive terminal groups in a block-type architecture wherein the terminal groups are ester moieties with excess unsaturated monomer such as styrene, isoprene, and butadiene.

Preparation of polyurethane polymers, high molecular weight polyester polymers, polyamide polymers and polyurea polymers from the ester-terminated polymers prepared by the process of this invention can be by procedures well-known in the prior art including well-known catalysts. The following procedures and catalysts are illustrative.

Low molecular weight dialcohol oligomers suitable for preparation of linear segmented polyurethanes of thermoplastic characteristics can be prepared by reacting linear non-crosslinked difunctional unsaturated diester oligomers with reactive terminal groups in a transesterification reaction wherein each terminal group is the same ester moiety with a large excess of a suitable alcohol of from 1 to 30 carbon atoms, preferably 1,6-hexanediol, 1,4-butanediol, 1,2-ethanediol, to end-cap the diester with a terminal alcohol moiety, at a temperature within the range of from about 100° C. to about 250° C. and a pressure of from atmospheric to about 0.005 mm Hg. Mole ratio of diester to alcohol can be in the range of from at least 1:5 to 1:1000, preferably from about 1:5 to about 1:50 to reduce the physical volume of the required reactants. The transesterification catalyst can be selected from the group consisting of titanium (IV) butoxide, titanium (IV) propoxide, dibutyltin dilaurate, tin octoate and other catalysts well-known as useful for a transesterification reaction. Reaction of the low molecular weight diol, the oligomer encapped with terminal alcohol moieties, with an isocyanate at a temperature within the range of from about 20° C. to about 250° C. at atmospheric pressure enables direct preparation of a linear segmented polyurethane of thermoplastic characteristics. Useful isocyanates include toluene diisocyanate (TDI), crude methylene bis(4-phenylisocyanate) (MDI), hexamethylene diisocyanate, various polymeric isocyanates, and different types of blends such as TDI/crude MDI. Polyurethane-forming catalysts are used to speed up and control the rate of reaction. Typical catalysts are tertiary aliphatic amines such as triethylamine, stannous oleate, dibutyltin dilaurate, dibutyltin di-2-ethyl hexoate, 1,4-diazabicyclo-(2,2,2)-octane and tin octoate.

Similarly to the procedure noted above for preparation of polyurethane polymers by preparing polyols, high molecular weight polyester polymers can be prepared by reacting linear telechelic difuncitonal unsaturated polymers prepared by the process of the instant invention, the said polymers containing terminal functional reactive groups comprising ester moieties reacted in a transesterification reaction with a linear dialcohol of from 1 to 30 carbon atoms in the preence of a transesterification catalyst at a temperature with in the range of from about 20° C. to about 250° C. and a pressure of from about 0.005 mm Hg to about 30 atmospheres. The transesterification catalyst can be as listed above.

Polyamides can be prepared by reaction of an oligomer end-capped with terminal ester moieties prepared as above, with a stoichimetric molar excess of up to 1000:1 of a linear diamine of from 1 to 30 carbon atoms in a condensation reaction in the presence of a condensation catalyst at a temperature within the range of from about 100° C. to about 250° C. at a pressure of from about 0.005 mm Hg to about 30 atmospheres. The condensation catalyst can be selected from the group consisting of potassium carbonate, sodium methylate, sodium hydroxide or pyridine.

Polyurea polymers can be prepared from linear telechelic difunctional unsaturated polymers prepared by the process of the instant invention, the said polymers having at least one internal carbon-to-carbon double bond and containing terminal functional reactive groups other than vinyl groups, the said terminal functional reactive groups comprising ester moieties selected from the group consisting of acrylate moieties, methacrylate moieties and undecylenate moieties, the process comprising; a) preparation of a difunctional diamine linear telechelic unsaturated polymer composition by reaction of said linear telechelic difunctional unsaturated polymer containing said ester moieties with a stoichiometric molar excess of up to 1000:1 of a linear diamine of from 1 to 30 carbon atoms in an amination reaction in the presence of an amination catalyst at a temperature within the range of from about 100° C. to about 250° C. at a pressure of from 0.005 mm Hg to about 30 atmospheres: and b) reacting the said difunctional diamine linear telechelic unsaturated polymer prepared as in (a) with an isocyanate in the presence of an amination catalyst at a temperature within the range of from about 0° C. to about 300° C. at a pressure within the range of from 0.005 mm Hg to 30 atmospheres to prepare a polyurea polymer. The ester group is preferably an undecylenate group and the linear diamines are preferably selected from the group consisting of 1,2-ethanediamine, 1,4-butanediamine, and 1,6-hexanediamine. The amination catalyst can be selected from the groups consisting of protic acids such as sulfuric acid.

Accordingly, the instant invention comprises an olefin metathesis process for preparing non-crosslinked linear mono- and difunctional telechelic polymers and to the polymers obtained thereby wherein the chain terminal groups are functional reactive groups other than vinyl groups wherein said process comprises two reactions, the first reaction (A) comprising an olefin metathesis reaction of acyclic olefins characterized as containing at least one functional group selected from the group consisting of a nitrile, ester, acyl halide, ketone, aldehyde, borane, amide, acid anhydride, ether, imide, halogen atom, and a substituted aryl group of up to 30 carbon atoms containing at least one reactive substituent to prepare a linear mono- or difunctional olefinic product, having at least one functional terminal reactive moiety, the second reaction (B) comprising a ring-opening polymerization of a cyclic olefin of from about 4 to 30 carbon atoms in the presence of a linear functional olefin having at least one functional terminal reactive moiety selected from the group consisting of the product of reaction (A), methyl acrylate, methyl methacrylate and alkyl undecylenates, wherein said reactions (A) and (B) are metathesis reactions in the presence of a catalyst composition comprising (a) a transition metal compound selected from the group consisting of halides, oxyhalides, oxides and organic ammonium salts, preferably of tungsten, ruthenium, molybdenum, rhenium or tantalum; an activator (b) selected from the group consisting of organic tin compounds, alkylaluminum halides, alkoxyalkylaluminum halides and aryloxy-alkylaluminum halides; and an organic Lewis base (c) selected from the group consisting of esters, ethers and nitriles of up to 30 carbon atoms, and other organic Lewis bases, preferably comprising alkyl acetates, acetonitrile, acetylacetone, tetrahydrofuran, pyridine, N,N'-dimethylformamide, thiophene, diphenylether, triethylamine, and organic phosphorus compounds, wherein said catalyst (a) is present in an amount of from about 0.01 to about 50 millimoles metal per mole of said reactants, activator (b) is present in a molar ratio to metathesis catalyst (a) of from about 0.001:1 to about 200:1, and organic Lewis base (c) is present in a molar ratio to metathesis catalyst (a) of from about 0.1:1 to about 10,000:1. The acyclic olefin can be selected from the group consisting of olefinic compounds of up to about 30 carbon atoms and unsaturated polymers.

The instant invention also comprises the linear monofunctional and telechelic difunctional polymers and compositions derived therefrom, particularly linear segmented polyurethanes of thermoplastic characteristics, high molecular weight polyester polymers, polyamides and polyureas.

The following examples are exemplary only and are not to be construed as limiting the scope of this invention.

EXAMPLE 1

The following illustrates the preparation of a functional oligomer from a cyclic olefin, 1,5-cyclooctadiene, and an ester, methyl methacrylate.

A 200-cc Fisher-Porter bottle was charged with the following in this order under nitrogen atmosphere: 35 mL chlorobenzene, 15.0 mL 1,5-cyclooctadiene (122 mmol), 3.75 mL methyl methacrylate (35 mmol), 0.56 mL propyl acetate (4.9 mmol), 0.48 g tungsten hexachloride (1.2 mmol, Aldrich Chemical Co., Milwaukee, Wis., 99.9%), and 0.34 mL tetramethyltin (2.4 mmol). The mixture was magnetically stirred at room temperature for several minutes, then heated to 80° C. The solution was stirred at 80° C. for 24 hours. GC analysis indicated complete (>99%) conversion of the 1,5-cyclooctadiene and approximately 20% conversion of the methyl methacrylate at this point. The reaction was terminated by addition of 50 mL 1N sodium hydroxide solution and vigorously stirred for about 5 hours at 80° C. The organic layer was then separated from the aqueous phase, washed with water, dried with magnesium sulfate, and stripped of solvent and remaining methyl methacrylate by rotary evaporation. A pale yellow, moderately viscous liquid product was obtained (10 grams, labelled Sample No. 15685-106-1). Nuclear magnetic resonance analysis (NMR) showed no remaining solvent or methyl methacrylate.

Molecular weight of the product was determined by gel permeation chromotography (GPC), number average molecular weight (Mn)=1290, weight average molecular weight (Mw)=2921 and the vapor pressure osmometry (VPO) (Mn=1162), indicated the product to be oligomeric. Infrared (IR) analysis of the product showed a strong carbonyl absorption at ~1725 wavenumbers, attributed to ester (methacrylic) endgroups, a moderate intensity C═C double bond absorption at 1640–1670, and a moderate intensity band at 910 attributed to vinyl endgroups.

A quantitative C-13 NMR analysis was performed of the product dissolved in chloroform-d with chromium acetylacetonate added as a relaxation agent. The spectrum was similar to that of 1,4-polybutadiene with the addition of weak resonances associated with vinyl and methyl methacrylic endgroups. Strong resonances were observed in the 128–132 ppm range, assigned as internal olefinic carbons of the oligomer backbone: $(-CH_2-CH=CH-CH_2-)_n$. Strong singlet resonances were observed at 33 ppm and 27.5 ppm in an approximate ratio of 2:1, assigned to methylene carbons adjacent to trans and cis internal backbone C═C double bonds, respectively. The relative integration of the backbone internal olefinic carbon and methylene carbon was about 1:1, as expected for 1,4-polybutadiene.

The NMR spectrum was consistent with two types of oligomer endgroups: —CH═CH$_2$ (vinyl) and —CH═C(CH$_3$)CO$_2$CH$_3$ (methyl methacrylic). Weak singlet resonances of approximately equal intensity were observed at 168.2 ppm (carbonyl carbon of methyl methacrylic endgroup), 141.6 and 127.6 ppm (olefinic carbons of methyl methacrylic endgroup), 138.2 and 114.5 ppm (vinyl endgroup carbons), 51.5 ppm (methoxy carbon of methyl methacrylic) and 12.4 ppm (allylic methyl of methyl methacrylic). (A NMR spectrum of a similar sample, 15685-172-1, indicated the 141.6 ppm resonance to be a CH, assigned as the CH olefinic carbon of the methyl methacrylic endgroup, and the 127.6 ppm peak to be a carbon with no attached hydrogens, assigned as the other methacrylic olefinic carbon). The integration of each of these endgroup resonances was about 1.5% of the total integration of internal backbond olefinic carbon (128– 132 ppm). No other endgroup types were discernible, and no other resonances were detected between 0 and 25 ppm, indicating a lack of any other methyl carbons besides that of the methyl methacrylic endgroup.

In summary, the spectroscopic and molecular weight data are consistent with an oligomeric product having a 1,4-polybutadiene structure with ester (methyl methacrylic) and vinyl endgroups.

EXAMPLE 2

The following illustrates the preparation of a functional oligomer from a cyclic olefin, 1,5-cyclooctadiene, and an ester, methyl acrylate.

The same procedure was performed as in Example 1 except that methyl acrylate (3.15 mL, 35 mmol) was employed instead of methyl methacrylate. GC analysis after 24 hours at 80° C. indicated 30% conversion of 1,5-cyclooctadiene and 19% conversion of methyl acrylate. Work-up (including rotary evaporation of solvent and remaining olefin reactants) yielded 3.3 g of a very pale yellow, clear, oily liquid (Sample No. 15685-142-2). IR analysis of the product showed a strong carbonyl absorption at ~1735 wavenumbers, attributed to ester (acrylic) endgroups, a moderate intensity C═C double bond absorption at 1640–1670, and a moderate intensity band at 910 attributed to vinyl endgroups.

Quantitative C-13 NMR analysis showed features similar to the product in Example 1, with methyl acrylic endgroup resonances instead of methyl methacrylic. The 1,4-polybutadiene backbone structure was observed, with a 0.3 trans/cis C═C double bond ratio (backbone internal double bonds). The relative integration of the backbone internal olefinic carbon and methylene carbon was about 1:1, as expected for 1,4-polybutadiene.

The NMR spectrum was consistent with two types of oligomer endgroups: —CH═CH$_2$ (vinyl) and —CH═CH—CO$_2$CH$_3$ (methyl acrylic). Weak singlet resonances of similar intensity were observed at 166.7 ppm (carbonyl carbon of methyl acrylic endgroup), 148.6 and 121.1 ppm (olefinic carbons of methyl acrylic endgroup), 148.6 and 121.1 ppm (olefinic carbons of methyl acrylic endgroup), 138.2 and 114.5 ppm (vinyl endgroup carbons), and 51.3 ppm (methoxy carbon of methyl acrylic). The integration of each of the methyl acrylic endgroup resonances was about 0.9% of the total integration of internal backbone olefinic carbon (128–132 ppm), while the integration of each of the two vinyl endgroup resonances was about 1.25%. No other endgroup types were discernible, and no resonances were detected between 0 and 25 ppm, indicating a lack of methyl carbons other than the methoxy.

In summary, the spectroscopic and molecular weight data are consistent with an oligomeric product having a 1,4- polybutadiene structure with ester (methyl acrylic) and vinyl endgroups.

EXAMPLE 3

The following illustrates the preparation of a telechelic difunctional oligomer with a two step process from a cyclic olefin, 1,5-cyclooctadiene, and an ester, methyl methacrylate.

1,2-Dichlorobenzene solvent (Aldrich Chemical Co., Milwaukee, Wis., HPLC grade) was purified by passage through a column of silica gel and 13X sieves, and stored over 4A sieves. Hexyl acetate and tetramethyltin were dried over 4A sieves. 1,5-Cyclooctadiene (Aldrich, 99+%) was stored over 4A sieves. Methyl methacrylate (Aldrich) was used as obtained without removal of inhibitor. Tungsten hexachloride (99.9%) was obtained from Aldrich, used as obtained, and stored under nitrogen.

The reaction vessel consisted of a 250-mL three-neck round-bottom glass flask (with magnetic stirbar) fitted with a water-cooled reflux condenser (on the center neck) and stopcock adapters (on outer necks). Prior to introduction of reagents, the apparatus was purged with a rapid flow of nitrogen (inlet at a flask neck and outlet through the condenser). The three-neck round-bottom flask was immersed in a constant-temperature oil bath for heating.

The following were added to a round-bottom flask under nitrogen at room temperature: 1,2-dichlorobenzene (35 mL), methyl methacrylate (13.0 mL, 122 mmol), 1,5-cyclooctadiene (15.0 mL, 122 mmol), hexyl acetate (1.60 mL, 9.7 mmol), tungsten hexachloride (0.97 g, 2.44 mmol), and tetramethyltin (0.68 mL, 4.9 mmol). The solution was stirred well to fully dissolve the tungsten hexachloride, and was then cannula-transferred to the above-described reaction vessel under nitrogen. The reaction vessel was heated to 80 deg C. The solution was stirred at 80 deg C. for 5 hours under static nitrogen atmosphere. (After the 5 hours, cyclooctadiene conversion was estimated to be essentially complete and methyl methacrylate conversion was estimated at 10–15%, by FID GC analysis). After 5 hours, a 1.5-SCFH nitrogen flow through the apparatus was initiated and maintained for the duration of the experiment.

The experiment was continued for a total of 4 days (approximately 96 hrs) at 80 deg C. After approximately 24 hours, GC analysis of the reaction solution indicated no remaining cyclooctadiene or methyl methacrylate. (Most of the methyl methacrylate loss was due to evaporation caused by the high nitrogen flow rate). IR analysis of a sample of the oligomer product at this point showed a strong ester endgroup band (C=O, 1725 wave numbers), but also a moderate-intensity vinyl endgroup band (910 wave numbers) indicating incomplete metathesis of the vinyl endgroups. An addition of fresh catalyst solution (1.60 mL hexyl acetate, 0.97 g tungsten hexachloride, and 0.68 mL tetramethyltin dissolved in 35 mL 1,2-dichlorobenzene) was made to the reaction vessel. IR analyses and additions of fresh catalyst solution were also performed after approximately 48 hours and approximately 72 hours. At the conclusion of the run (approximately 96 hours), IR analysis showed only a very weak vinyl endgroup band remaining in the oligomer product, with a strong carbonyl band (1725 wave numbers).

The reaction solution was cooled to room temperature, and quenched by bubbling dry ammonia gas through the solution for 40 minutes. The black precipitate which was produced by the ammonia treatment was removed by filtration. Solvent was removed from the filtrate by rotary evaporation at 95 deg. C., leaving 10.3 g of a viscous, yellow-orange, cloudy oligomer product (Sample No. 15685-17201). Quantitative C-13 NMR was performed using chloroform-d as solvent with chromium acetylacetonate added as a relaxation agent. The C-13 NMR spectral data for this product are given in Table I. The spectrum indicates a 1,4-polybutadiene backbone structure for the oligomer, with methyl methacrylic and vinylic endgroups. There was no clear evidence in the NMR analysis for other endgroup types. Assuming acyclic and non-branched chains, the ester (methyl methacrylic endgroup) functionality was estimated at Fn=1.7 (85% ester endgroups, 15% vinyl endgroups). The trans/cis ratio of C—C bonds in the 1,4-polybutadiene backbone was about 3:1. Mn was estimated at 1200–1600. No poly(methyl methacrylate) was detected in the NMR. However, a broad underlying resonance of significant area was seen in the sp3 carbon region (10–54 ppm), assigned as "detrital carbon" $CH_2$ and CH species. Since the specific character of this "detrital" material is not clear, the functionality number (Fn) calculated above is only an approximation.

TABLE I

| Chemical Shift (ppm.d) | Relative Integration | Assignment |
| --- | --- | --- |
| 128–132 (m) | 350 | Internal Olefinic carbons (backbone) |
| 168.4 (s) | 17.7 | C=O of methyl methacrylic endgroup |
| 141.9 (s) | 15.7 | =CHR of methyl methacrylic endgroup |
| 127.9 (s) | 16.3 | =CRMe of methyl methacrylic endgroup |
| 51.7 (s) | 18.4 | $OCH_3$ of methyl methacrylic endgroup |
| 12.6 (s) | 17.2 | allylic —$CH_3$ of methacrylic endgroup |
| 138.2 (s) | 2.6 | =CHR of vinylic endgroup |
| 114.5 (s) | 2.6 | =$CH_2$ of vinylic endgroup |
| 32.9 (s) | 222 | $CH_2$ adjacent to trans —C=C— (backbone) |
| 27.6 (s) | 60 | $CH_2$ adjacent to cis —C=C— (backbone) |
| 27–33 **a | 110 | Other $CH_2$ resonances |
| 10–54 (br) **b | 154 | Detrital sp3 C |

**a A number of small singlet resonances, some overlapping, assigned as $CH_2$s; primarily $CH_2$s alpha and beta to endgroups.
**b Very broad, underlying resonance, primarily sp3 $CH_2$ and sp3 CH with little $CH_3$.

EXAMPLE 4

The following illustrates the preparation of a telechelic difunctional oligomer with a two-step process from an acyclic olefin and a cyclic olefin.

Chlorobenzene (Aldrich Chemical Co., Milwaukee, Wis., HPLC grade was purified by passage through a column of silica gel and 13X sieves, and stored over 4A sieves. Tetramethyltin (Aldrich, 99+%) was dried over 4A sieves. Tungsten hexachloride (Aldrich, 99.9+%) was used as obtained. Methyl undecylenate (methyl 10-undecenoate, 97%) was obtained from Elf Atochem, Philadelphia, Pa., and purified by treatment with aqueous NaOH and water followed by drying (with magnesium sulfate) and vacuum distillation; the purified material was stored over 4A sieves. 1,5-Cyclooctadiene (Aldrich, 99.3%) was fractionally distilled using a 20-tray Oldershaw column at a reflux ratio of 15:1. The distilled product was determined to be 99.9% pure by gas chromatography, containing less than 0.01% 4-vinyl-1-cyclohexene. The distilled cyclooctadiene was further purified by passage through a column of basic activated alumina LaRoche Chemicals A-204-4, LaRoche Chemicals, Baton Rouge, La., then stored over 4A sieves under nitrogen.

Process Step (1):

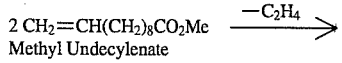 

MeO$_2$C(CH$_2$)$_8$CH=CH(CH$_2$)$_8$CO$_2$Me

Dimethyl 10-Eicosene-1,20-dioate

Tungsten hexachloride (3.2 g, 8.0 mmol) was dissolved in methyl undecylenate (90 mL, 400 mmol) under nitrogen. The solution was syringed into a 500 mL flask with attached reflux condenser which had been purged with nitrogen and preheated to 50 deg C. using an oil bath. After 30 minutes, tetramethyltin (2.2 mL, 16 mmol) was syringed into the solution and the temperature was raised to 75 deg C. The solution was stirred at 75 deg C. for 19 hours under a slow flow of nitrogen, then cooled to room temperature. Dry gaseous ammonia was bubbled through the solution for 30–40 minutes to quench the reaction. Hexane was added to the solution, and precipitated catalyst residue was removed by filtration. The filtrate was then subjected to rotary evaporation at 90–150 deg C. using a mechanical vacuum pump to remove hexane and unreacted methyl undecylenate. Upon cooling, an orange crystalline solid was obtained. It was dissolved in methanol and decolorized by treatment with charcoal. The product was then recrystallized several times from aqueous methanol at 0 deg C., affording 22.3 g (60 mmol) of white, crystalline dimethyl 10-eicosene-1,20-dioate (m.p. 44 deg C.).

Process Step (2): Reaction of dimethyl 10-eicosene-1,20-dioate with excess 1,5-cyclooctadiene to yield ester-terminated, difunctional 1,4-polybutadiene oligomer.

Under nitrogen, a 250-mL flask was charged with dimethyl 10-eicosence-1,20-dioate (7.0 g, 19 mmol), chlorobenzene (85 mL), 1,5-cyclooctadiene (56.5 mL, 460 mmol), tungsten hexachloride (37 mg, 0.093 mmol), and tetramethyltin (26 uL, 0.19 mmol). The solution was then heated to 100 deg C. and stirred under a nitrogen atmosphere. After 4.5 hours at 100 deg C., additional catalyst solution (37 mg tungsten hexachloride and 26 uL tetramethyltin dissolved in 2 ml chlorobenzene) was syringed into the reaction flask. The solution was then stirred for an additional 17.5 hours (22 hours total) at 100 deg C., then cooled to room temperature. Gas chromatographic analyses indicated 99.9% conversion of 1,5-cyclooctadiene and 87% conversion of dimethyl 10-eicosene-1,20-dioate. Gaseous ammonia was bubbled through the reaction solution for 10 minutes. The solution was degassed and then filtered to remove precipitated catalyst residue. The filtered solution was then subjected to rotary evaporation at 100–110 deg C. using a mechanical vacuum pump to remove volatile liquids, leaving a viscous liquid product. To remove unreacted dimethyl eicosene dioate and very low molecular weight products, the viscous liquid was dissolved in dichloromethane and then precipitated by addition of a large quantity of methanol. The precipitated viscous liquid was collected and washed with additional methanol. The dissolution/precipitation procedure was repeated. The final precipitated (methanol-insoluble) viscous liquid product was clear and pale yellow; yield was 44 g (77% yield based on weight of reactants). No dimethyl 10-eicosene-1,20-dioate was detected by gas chromatography in this product, but it was detected in the methanol washings from the dissolution/precipitation procedure.

A quantitative carbon-13 NMR was performed of the product dissolved in chloroform-d with chromium acetylacetonate added as a relaxation agent. The NMR spectrum was consistent with the following ester-terminated, difunctional 1,4-polybutadiene oligomer structure:

MeO$_2$C(CH$_2$)$_7$—(CH$_2$CH=CHCH$_2$)$_n$—(CH$_2$)$_7$CO$_2$Me

Strong resonances were observed in the spectrum in the 128–132 ppm range, assigned as internal olefinic carbons of a 1,4-polybutadiene backbone: (—CH$_2$—CH=CH—CH$_2$—)$_n$. Strong singlet resonances were observed at 32.5 ppm and 27.5 ppm in a 59/41 integrated intensity ratio, assigned as methylene carbons adjacent to trans (59%) and cis (41%) internal backbone carbon-carbon double bonds, respectively. The relative intensity of the combined backbone olefinic carbon resonances was equal (to within 1%) to that of the combined adjacent methylene carbon resonances, consistent with a 1,4-polybutadiene structure. The spectrum indicated that the product possessed ester endgroups of the structure —(CH$_2$)$_7$CO$_2$Me: weak singlet resonances of equal intensity were observed at 173.5 ppm (carbonyl carbon of the ester), 51.1 ppm (methoxy carbon of ester), 33.8 ppm (methylene carbon alpha to carbonyl), and 24.8 ppm (methylene carbon beta to carbonyl); a broad resonance was observed at 29.1 ppm with 5-fold greater intensity (five methylene carbons). Although the signal-to-noise ratio of the spectrum was very high (about 100:1 for the carbonyl carbon endgroup signal), no other resonances were detected other than sidebands of major peaks. No other endgroup types were detected, such as saturated methyl or ethyl endgroups (10–24 ppm) or vinyl endgroups (110–120 ppm, 132–142 ppm). Neither were vinyl endgroups detected in a proton NMR spectrum of the product. The NMR data thus indicate the acyclic oligomer product to be purely difunctional with respect to ester endgroups (Fn=2.0).

Number-average molecular weight ($M_n$) of the product was computed at 4,030 g/mole using relative integrated intensities from the carbon-13 NMR spectrum (carbonyl carbon=6.87; methoxy carbon=6.70; combined backbone olefinic carbon=466) and the relation, $M_n$=n(54.1)+314.5, which is based upon the product structure shown above.

EXAMPLE 5

This example illustrates the effect of the amount of catalyst charge upon difunctional oligomer product purity.

A procedure was followed similar to that of Example 4, except that a greater amount of catalyst (relative to monomer amounts) was employed in the second process step (reaction of dimethyl 10-eicosene-1,20-dioate with 1,5-cyclooctadiene). The molar 1,5-cyclooctadiene/WCl$_6$/SnMe$_4$ ratio employed in this example was 500/1/2 (vs. 2500/1/2 in Example 4). The reaction was terminated after 2.5 hours at 100 deg C., at which point 1,5-cyclooctadiene conversion was 99.9% and dimethyl 10-eicosene-1,20-dioate conversion was 94% as determined by gas chromatography. The viscous liquid oligomer product was isolated by the procedure of Example 4, and analyzed by carbon-13 NMR. The NMR spectrum was similar to that of Example 4 with the addition of two very weak singlet resonances of equal intensity at 138.0 ppm and 114.3 ppm, assigned as the =CHR and =CH$_2$ carbons, respectively, of a vinyl endgroup: RHC=CH$_2$. The integrated intensity of each vinyl endgroup carbon resonance was 1–2% of the intensity of the ester endgroup carbonyl carbon resonance. This indicates that 1–2% of the oligomer endgroups of this product were non-functional (meaning non-ester), and thus the product was not as difunctionally pure as that of Example 4.

Number-average molecular weight of this product was determined to be 3,680 g/mole by vapor pressure osmometry (VPO), and was calculated by carbon-13 NMR to be 3,860 g/mole.

EXAMPLE 6

This example illustrates the effect of reactant purity, in particular the purity of the cyclic olefin monomer, upon difunctional oligomer product purity.

A procedure was followed similar to that of Example 4, except that the 1,5-cyclooctadiene employed in the second process step was less pure. In this example, 1,5-cyclooctadiene (Aldrich, 99.3% pure by gas chromatographic analysis) was used without further purification by distillation. GC analysis indicated the presence of several organic impurities, including 0.2% 4-vinyl-1-cyclohexene. In this example, the amount of catalyst employed in the second process step was the same as in Example 5: 500/1/2 1,5-cyclooctadiene/ $WCl_6/SnMe_4$. The reaction was terminated after 4 hours at 100 deg C., at which point 1,5-cyclooctadiene conversion was 99.6% and dimethyl 10-eicosene-1,20-dioate conversion was 85% as determined by gas chromatography. The viscous liquid oligomer product was isolated by the procedure of Example 4, and analyzed by carbon-13 NMR. The NMR spectrum was similar to that of Example 5, except that the two vinyl endgroup carbon resonances (138.0 ppm and 114.3 ppm) were more intense, each with an integrated intensity of 7–8% of the intensity of the ester endgroup carbonyl carbon resonance. This indicates that 7–8% of the oligomer endgroups of this product were vinyl and non-functional (meaning non-ester), and thus the product was less difunctionally pure than that of Example 5.

EXAMPLE 7

The following illustrates the preparation of ester-functionalized oligomers and polymers by cross-metathesis reaction of an unsaturated polymer, 1,4-polybutadiene, with an ester, methyl methacrylate. The ester-functionalized oligomers prepared are of lower molecular weight.

Reagents: A high molecular weight cis-1,4-polybutadiene (Goodyear, Budene 1208, date code BC180891, 98% cis-1, 4, Mn 85,000–95,000, Mw 400,000–420,000) was employed in neat, uncured form. 1,2-Dichlorobenzene, Aldrich HPLC grade, was purified by passage through a column of silica gel and 13X sieves, and stored over 4A sieves. Propyl acetate and tetramethyltin were dried over 4A sieves. Methyl methacrylate (Aldrich, 99%) was used as obtained without removal of inhibitor, Tungsten hexachloride (Aldrich, 99.9+%) was used as obtained.

A 200-cc Fisher-Porter bottle was charged with the following in this order under nitrogen atmosphere: 4.5 g polybutadiene (83 mmol $CH_2CH=CHCH_2$— repeat unit), 140 mL 1,2-dichlorobenzene, 2.2 mL methyl methacrylate (21 mmol), 0.38 mL propyl acetate (3.3 mmol), 0.33 g tungsten hexachloride (0.83 mmol), and 0.23 mL tetramethyltin (1.7 mmol). The mixture was magnetically stirred at room temperature for several minutes, then heated to 80 deg C. It was noted that the polybutadiene was not entirely dissolved after 3–4 hours at 80 deg C. The solution was stirred at 80 deg C. for a total of 20.5 hours, at which point there was no evidence of undissolved polymer. The solution was cooled to room temperature and the reaction terminated by bubbling dry gaseous ammonia through the solution for 10 minutes. The solution was filtered to remove catalyst residue. Volatile liquids (dichlorobenzene, propyl acetate, and unreacted methyl methacrylate) were removed from the filtered solution by rotary evaporation, leaving a viscous brown liquid product (4.5 g).

The low molecular weight of this product was determined by GPC (Mn=410, Mw=1170). IR analysis of the product showed a carbonyl band at 1717.5 wavenumbers, attributed to ester (methacrylic) endgroups, a weak intensity C=C band at 1640-1670 wavenumbers, and a weak band at 910 wavenumbers attributed to vinyl endgroups.

A quantitative C-13 NMR was performed of the product dissolved in chloroform-d with chromium acetylacetonate added as a relaxation agent. Strong resonances were observed in the 128–132 ppm range, assigned as internal olefinic carbons of the 1,4-polybutadiene backbone: $(—CH_2CH=CH—CH_2—)_n$. Strong singlet resonances were observed at 32.5 ppm and 27.2 ppm in an approximate ratio of 1:1, assigned to methylene carbons adjacent to trans and cis internal backbone C=C double bonds, respectively. The relative integration of the backbone internal olefinic carbon and methylene carbon was about 1:1, as expected from 1,4-polybutadiene. The spectrum was consistent with two types of endgroups: $—CH=CH_2$ (vinyl) and $—CH=C(CH_3)CO_2CH_3$ (methyl methacrylic). Weak singlet resonances were observed at 168.1 ppm (carbonyl carbon of methyl methacrylic endgroup), 141.5 ppm (an olefinic carbon of methyl methacrylic endgroup), 138.1 and 114.4 ppm (vinyl endgroup carbons), 51.4 ppm (methoxy carbon of methyl methacrylic) and 12.3 ppm (allylic methyl of methyl methacrylic). The integration of each of the endgroup resonances was in the range of 1–2% of the total integration of internal backbond olefinic carbon (128–132 ppm). Integrated intensities of the vinyl carbon resonances were roughly double those of the methyl methacrylic resonances.

The spectroscopic and molecular weight data indicate the product to consist of low molecular weight 1,4-polybutadiene oligomers and ester (methyl methacrylic) and vinyl endgroups. This is the product of metathesis depolymerization.

EXAMPLE 8

The following illustrates the preparation of a high molecular weight polyester from polycondensation of a 1,4-polybutadiene alpha, omega-diester and a diol. The preparation demonstrates the difunctionality of a diester prepared by the process of the instant invention and provides evidence for difunctionality in the polyesterification of a polybutadiene diester with a diol.

A telechelic difunctional oligomer prepared as in the process of Example 4 was polyesterified with 1,6-hexanediol. A separate polyesterification reaction was performed with 1,12-dodecanediol. The procedures were as follows:

To a 50 ml round-bottom flask with a nitrogen atmosphere containing 5.00 g (1.39 mmol) of polybutadiene diester (Sample No. 18098-103A), estimated number average molecular weight 3600, IV=0.11 dl/g in 60:40 phenol: 1,1,2,2-tetrachloroethane (PTCE), and 0.821 g (6.95 mmol) of 1.6-hexanediol, Aldrich Gold Label, Aldrich Chemical., Milwaukee, Wis., was added 0.02 g (2 drops) of titanium (IV) butoxide (3400 ppm). In a Kugelrohr "thin film"

reactor, the mixture was heated to 150° C. at one atmosphere pressure for three hours and then the pressure was reduced to 0.005 mm Hg for an additional three hours.

The resultant polymer (Sample No. 15747-131) was a clear rubbery solid, 5.09 g; yield was 99% of theoretical. The IV was 0.76 dl/g in 1,2,4-trichlorobenzene. Number average molecular weight by gel permeation chromatography (GPC) was 64,000 versus polypropylene standard. Solubility in 1,2,4-trichlorobenzene indicated that the polymer was substantially linear.

Verification of the transesterification procedure was made by synthesis of high polymer from other unsaturated aliphatic diesters. A reaction was run in which the polybutadiene diester was replaced by a $C_{20}$-unsaturated aliphatic diester, dimethyl 10-eicocene-1,20-dioate. In a two-step process, a waxy prepolymer intermediate was isolated initially, and subsequently its molecular weight was advanced by heating at 220° C. under vacuum (0.3 mm Hg). This gave a tough, high molecular weight polyester (IV 0.90 dl/g in 60:40 phenol:tetrachloroethane) which was soluble in 1,2,4-trichlorobenzene.

EXAMPLE 9

The following illustrates the preparation of a polymer free of a predominant color and containing less than 100 parts per million of tungsten comprising a methyl ester-terminated difunctional 1,4-polybutadiene polymer prepared in Example 4.

The final precipitated (methanol-insoluble) viscous liquid product, clear and pale yellow in color, 250 g, containing 370 ppm tungsten, analysis by inductively coupled plasma spectroscopy (ICP), of Example 4, was dissolved in dichloromethane, at least 200 cc, in a one-liter Edenmeyer flask equipped with a stir-bar. Activated carbon, 24 g, 100 mesh (fine), Atlas Chemical Industries, Wilmington, Del., was added to the flask. Total volume in the flask was 650–700 cc. A nitrogen purge for 10 minutes removed air from the flask through the stopper and the flask was sealed. The polymer solution was stirred for approximately 64 hours at room temperature.

After the period of stirring, the polymer solution was filtered through diatomaceous earth under a vacuum of 20 inches Hg to remove the dichloromethane solvent. The viscous polymer free of a predominant color was analyzed by inductively coupled plasma spectroscopy (ICP). Tungsten content was less than 100 ppm.

EXAMPLE 10

The following illustrates the preparation of a low molecular weight oligomer of a difunctional telechelic polybutadiene dialcohol by transesterification of a polybutadiene diester prepared as in Example 4 with an aliphatic dialcohol, 1,6-hexanediol, in a 50-fold stoichiometric excess of 1,6-hexanediol, to prepare oligomers with predominantly one or two polybutadiene units per chain.

To a 1-L flask with a nitrogen atmosphere containing 50.3 g (13.6 mmol) of polybutadiene diester (Sample No. 18098-115A, formula weight 3700) and 79.9 g (676 mmol) of 1,6-hexanediol was added 1.3 g (3.8 mmol) of titanium (IV) butoxide. In a Kugelrohr "thin film" reactor, the mixture was heated to 150° C. for 2 hour, and then to 200° C. for an additional 4 hour to give a yellow suspension. Carbon NMR analysis on the mixture indicated that transesterification was complete; the methyl ester signal (—OCH$_3$) at 51.8 ppm for starting material was replaced by a new signal at 64.5 ppm for hexyl ester.

In the purification step, the addition of 300 ml of diethyl ether to the mixture gave a white suspension which was filtered through a medium glass frit to give 70 g (89% recovery) of 1,6-hexanediol. Then, solvent extraction of the organic filtrate with water removed the water-soluble 1,6-hexanediol, leaving an ether solution of the polybutadiene oligomer. Evaporation of solvent at low temperature (<45° C.) under vacuum gave 44 g (88% yield) of a viscous yellow oil (Sample No. 15747-155.13). Chemical and spectroscopic methods were consistent with the proposed structure. Hydroxyl titration: 0.523 mEq OH/g (Calcd Mn 3824 based on difunctional structure). Carbon NMR: calcd Mn 3862. GPC (vs. polybutadiene standard): Mn 5055, Mw 8968, PI 1.78.

EXAMPLE 11

The procedure of Example 10 was repeated with a five-fold excess of 1,6-hexanediol to generate a mixture of alcohol encapped oligomers with a degree of polymerization of about 1.5, that is, mostly oligomers with either one or two polybutadiene units per chain.

To a 50 ml flask with a nitrogen atmosphere containing 5.00 g (1.35 mmol) of polybutadiene diester (Sample No. 18098-115A, FW 3700) and 0.821 g (6.95 mmol) of 1,6-hexanediol was added 0.2 g (20 drops) of titanium (IV) butoxide (34000 ppm). In a Kugelrohr "thin film" reactor, the mixture was heated to 150° C. for 3 hour to give 5.54 g of orange oily solid. Carbon NMR analysis on the product indicated that transesterification was complete because none of the characteristic methyl ester signal (—OCH$_3$) at 51.8 ppm from starting material was detected; it was replaced by a new signal at 64.5 ppm which is assigned the corresponding methylene carbon of the hexyl ester.

In a second step, purification of the product was effected by selective solvent extraction of the excess 1,6-hexanediol using acetone which is a non-solvent for the polybutadiene oligomer. Solvent extraction can have a distinctive advantage over vacuum distillation as a purification method because it avoids the possibility of heat-induced coupling of the oligomers that might occur in the latter. A single acetone wash of the oily reaction mixture in the same reactor flask accomplished the desired result, i.e., nearly complete removal of the monomeric alcohol by NMR analysis and quantitative recovery of oligomer. As predicted from the reaction stoichiometry, gel permeation chromatography on the product confirmed the presence of some higher homologs (Mn 6500).

EXAMPLE 12

The following illustrates the preparation of a polyurethane from a difunctional telechelic polybutadiene diol prepared as in Example 10.

In a 100 ml 3-neck round bottom flask equipped with a mechanical stirrer and a gas inlet was placed 2.50 g (1.31 mE OH, based on OH titration of 0.523 mE/g) of the diol of Example 10, Sample No. 15747-155.13), 0.013 g (0.1 mmol, 1 mol %/OH) of triethylamine (MW 101.2), and 5 ml of N-methylpyrrolidinone (NMP). To the stirred solution at 25° C. was added 0.115 g (0.66 mmol, 1.0 equivalents NCO/OH) of toluene diisocyanate (a 20:80 mixture of 2,6- and 2,4-isomers, Aldrich Chemical Co., Milwaukee, Wis.) in 2 ml of NMP. The stirred mixture was then heated at 85° C. for 16 hours.

Work-up: At room temperature, the viscous yellow solution was poured into 300 ml 95% methanol, and it coagulated into a gelatinous mass. The solid was triturated 4 times with 100 ml 95% methanol, 2 times with 100 ml water, 2 times with 100 ml 95% methanol, and dried at 90° C./10" Hg in a vacuum oven for 6 hours to give 2.44 g (93% of theory) of poly(1,4-polybutadiene urethane), as a foamed tacky solid with good mechanical integrity.

The experimental verification of the difunctionality of a telechelic polybutadiene diester precursor is described below:

A high molecular weight polyester was synthesized via the titanium catalyzed polyesterification of polybutadiene diester (Sample No. 18098-103A) with 1,6-hexanediol, as follows: to a 50 ml round bottom flask with a nitrogen atmosphere containing 5.00 g (1.39 mmol) of polybutadiene diester (Sample No. 18098-103A, FW 3600, IV=0.11 1,6-hexanediol (Aldrich, Gold Label, was added 0.02 g (2 drops) of titanium (IV) butoxide (3400 ppm). In a Kugelrohr "thin film" reactor, the mixture was heated to 150° C. for 3 hour, and then the pressure was reduced to 0.005 mm Hg for an additional 3 hours. The resultant polymer (Sample No. 15747-131) was a clear rubbery solid (5.09 g 99% of theoretical yield), IV =0.76 dl/g in 1,2,4-trichlorobenzene; GPC, Mn=64,000 (vs. polypropylene standard).

That which is claimed is:

1. A process for the preparation of a linear telechelic difunctional unsaturated polymer having at least one internal carbon-to-carbon double bond and containing terminal functional reactive groups other than vinyl groups, from olefinic compound reactants in a process comprising:

(i) reaction (A) comprising an olefin methathesis reaction of acyclic linear olefinic compound reactants comprising at least one of said acyclic olefinic compounds containing up to 30 carbon atoms and containing at least one functional reactive group selected from reactive moieties consisting of a nitrile, ester, acyl halide, ketone, aldehyde, borane, amide, acid anhydride, ether, imide, and halogen atom moieties, and a substituted aryl group containing up to an additional 30 carbon atoms, the substituents of said substituted aryl group comprising at least one reactive substituent of said functional reactive group of moieties, and combinations of said reactive moieties, to prepare a linear functional olefinic compound product having at least one functional terminal reactive moiety, and an olefinic compound co-product of lower molecular weight than said one of acyclic linear olefinic compound reactants, and to (ii) reaction (B) comprising a ring-opening polymerization of a cyclic olefin in the presence of a linear functional olefinic compound having at least one functional terminal reactive moiety consisting of the linear functional olefinic compound product or reaction (A), prepare a polymer comprising a linear telechelic difunctional unsaturated polymer, and, wherein said reactions (A) and (B) are metathesis reactions in the presence of a catalyst composition comprising a metathesis catalyst (a) comprising a transition metal compound selected from the group consisting of halides, oxyhalides, oxides and organic ammonium salts; an activator (b) selected from the group consisting of organic tin compounds, alkylaluminum halides, alkoxyakylaluminum halides and aryloxy-alkylaluminum halides, and an organic Lewis base (c), said metathesis catalyst (a) is present in an amount of from about 0.01 to about 50 millimoles per mole of said reactants, activator (b) is present in a molar ratio to metathesis catalyst (a) of from about 0.001:1 to about 200:1, and organic Lewis base (c) is present in a molar ratio to metathesis catalyst (a) of from about 0.1:1 to about 10,000:1, said reactions (A) and (B) conducted at a reaction temperature of from about 0° C. to about 200° C. and conducted at a reaction pressure of from about $1 \times 10^{-6}$ mm Hg to about 30 atmospheres.

2. The process of claim 1 wherein metal of said transition metal compound is selected from the group consisting of tungsten, molybdenum, rhenium, tantalum, and ruthenium.

3. The process of claim 1 wherein said organic Lewis base (c) is selected from the group consisting of acyclic linear olefinic compound reactants of reaction (A), and esters, ethers, nitriles of up to 30 carbon atoms, alkyl and aryl acetates, alkyl acrylates, alkyl methacrylates, alkyl undecylenates, ethyl ether, propyl ethers, diphenyl ether, acetonitrile, benzonitrile, acrylonitrile, acetylacetone, tetrahydrofuran, pyridine, N,N'-dimethylformamide, thiophene, triethylamines, phenyl acetylene, organic phosphorous compound of from 1 to 30 carbon atoms, monohydric and dihydric alcohols of from 1 to 30 carbon atoms.

4. The process of claim 1 wherein said acyclic linear olefinic compound reactants in reaction (A) comprise an unsaturated polymer of number average molecular weight of up to 1,000,000 and a second acyclic linear olefinic compound containing at least one functional reactive group selected from said reactive moieties, said unsaturated polymer selected from the group consisting of low molecular weight oligomers and high molecular weight polymers selected from the group consisting of polybutadiene, polyisoprene, butyl rubber and mixtures thereof.

5. The process of claim 1 wherein said process comprises reaction (A) between two acyclic olefinic compounds, one acyclic olefinic compound comprising a high molecular weight unsaturated polymer of number average molecular weight of up to 1,000,000 selected from the group consisting of polybutadiene, polyisoprene, butyl rubber and mixtures thereof, the second acyclic olefinic compound comprising a monofunctional olefinic compound of from 2 to about 30 carbon atoms.

6. The process of claim 1 wherein said linear functional olefinic compound is selected from the group consisting of an alkyl undecylenate of up to 30 carbon atoms, allyl acetate, allyl propionate, and vinyl acetate, and the cyclic olefin comprises 1,5-cyclooctadiene.

7. The process of claim 1 wherein said cyclic olefin is selected from the group consisting of cycloheptene, 1,3-cyclooctadiene, 1,4-cyclooctadiene, 1,5-cyclooctadiene, norbornene, norbornadiene, 2,2,2-bicyclooctene-2, cyclooctene, cyclodecene methyl cyclooctadienes, dimethyl cyclooctadienes, methyl cyclooctenes, dimethyl cyclooctenes, 1,4,7-cyclononatriene, 1,4-cyclodecadiene, 1,5-cyclododecadiene, 1,6cyclodecadiene, 1,7-cyclododecadiene, 1,4,7-cyclododecatriene, 1,5,9-cyclododecatriene, trimethyl 1,5,9-cyclododecatriene, cyclopentene, cyclododecene, cyclobutene, 1,9,17-cyclotetracosatriene, 1-methyl-1,5cyclooctadiene, 3-phenyl-1-cyclooctene, 3-benzyl-1-cyclooctene, 3-tolyl-1cyclooctene, 5-chloro-1-cyclooctene, 1-chloro-1,5-cyclooctadiene, 5-chloro-1-cyclododecene, 5,5-dichloro-1-cyclooctene, and mixtures thereof.

8. The process of claim 1 wherein said metathesis catalyst (a) is tungsten hexachloride, activator (b) is tetramethyltin, and Lewis base (c) is propyl acetate.

9. The process of claim 1 wherein said metathesis catalyst (a) is present in a ratio of from about 0.1 to 10 millimoles per mole of said reactants and said activator (b) and said Lewis base are each present in a ratio to said metathesis catalyst (a) of from about 1:1 to about 10:1.

10. The process of claim 1 wherein said olefinic compound co-product of lower molecular weight than said one of acrylic linear olefinic compound reactants produced by said reaction (A), wherein said olefinic compound co-product is removed from said process by suitable methods consisting of a purge of the olefin metathesis reaction (A) with an inert gas, application of a low vacuum in the range of from about 1 mm Hg to about 400 mm Hg during said reactions and application of a high vacuum to about $1 \times 10^{-6}$ mm Hg, said suitable methods being in any sequence and subject to omission.

* * * * *

UNITED STATES PATENT AND TRADEMARK OFFICE
CERTIFICATE OF CORRECTION

PATENT NO.: 5,512,635

DATED: April 30, 1996

INVENTOR(S): Philip O. Nubel, Howard B. Yokelson, Steven A. Cohen, Raymond T. Behrends, William G. Bouslog, James P. Nelson It is certified that error appears in the above-identified patent and that said Letters Patent is hereby corrected as shown below:

| Col. | Line | | |
|---|---|---|---|
| 7 | 21 | "1-octabne" should read | -- 1-octene -- |
| 21 | 38-39 | "dimethyl 10-eicosence-1,20-dioate" should read | --dimethyl 10-eicosene-1,20-dioate-- |
| 27 | 48-49 | "acyclic linear olefinic compound reactants, and to" should read | --acyclic linear olefinic compound reactants, and-- |
| 27 | 55 | "prepare a polymer comprising a linear telechelic difunctional unsaturated polymer," should read | --to prepare a polymer comprising a linear telechelic difunctional unsaturated polymer,-- |

UNITED STATES PATENT AND TRADEMARK OFFICE
CERTIFICATE OF CORRECTION

PATENT NO.: 5,512,635

DATED: April 30, 1996

INVENTOR(S): Philip O. Nubel, Howard B. Yokelson, Steven A. Cohen, Raymond T. Behrends, William G. Buslog, James P. Nelson It is certified that error appears in the above-identified patent and that said Letters Patent is hereby corrected as shown below:

| Col. | Line | |
|------|------|---|
| 28 | 20-21 | "triethylamines, phenyl acetylene, organic phosphorous compound" should read --triethylamine, phenyl acetylene, organic phosphorous compounds-- |
| 28 | 54 | "1,6cyclodecadiene," should read --1,6-cyclodecadiene,-- |
| 28 | 58 | "1-methyl-1,5cyclooctadiene," should read --1-methyl-1,5-cyclooctadiene,-- |
| 28 | 59 | "3-tolyl-1cyclooctene," should read --3-tolyl-1-cyclooctene,-- |
| 29 | 2 | "Lewis base are each present" should read --Lewis base (c) are each present-- |
| 29 | 6 | "acrylic linear olefinic compound" should read --acyclic linear olefinic compound-- |

Signed and Sealed this

Twenty-fourth Day of September, 1996

Attest:

BRUCE LEHMAN

Attesting Officer

Commissioner of Patents and Trademarks